Sept. 19, 1939.  W. P. MASON ET AL  2,173,589
PIEZOELECTRIC APPARATUS
Filed Dec. 14, 1933   5 Sheets—Sheet 1

$x_x = -6.4 \times 10^{-8} E_x$
$y_y = 6.4 \times 10^{-8} E_x$
$y_z = 1.7 \times 10^{-8} E_x$
$z_z = 0$
$z_x = 0$
$x_y = 0$ $S'_{24}$ FOR ROTATION OF AXES ABOUT THE X (ELECTRIC) AXIS INVENTORS: W. P. MASON
R. A. SYKES
BY
E. V. Griggs
ATTORNEY Sept. 19, 1939.　　W. P. MASON ET AL　　2,173,589
PIEZOELECTRIC APPARATUS
Filed Dec. 14, 1933　　5 Sheets—Sheet 2

VALUES OF $d'$ AND $s'$ FOR ROTATION ABOUT THE X CRYSTALLOGRAPH AXIS

INVENTORS: W.P. MASON
R.A. SYKES
BY
E.V. Griggs
ATTORNEY

Sept. 19, 1939.   W. P. MASON ET AL   2,173,589
PIEZOELECTRIC APPARATUS
Filed Dec. 14, 1933   5 Sheets-Sheet 5

INVENTORS W. P. MASON
R. A. SYKES
BY
E. V. Griggs
ATTORNEY

Patented Sept. 19, 1939

2,173,589

UNITED STATES PATENT OFFICE 2,173,589

PIEZOELECTRIC APPARATUS

Warren P. Mason, West Orange, N. J., and Roger A. Sykes, New York, N. Y., assignors to Bell Telephone Laboratories, Incorporated, New York, N. Y., a corporation of New York Application December 14, 1933, Serial No. 702,334

30 Claims. (Cl. 171—327)

This invention relates to piezoelectric apparatus and more particularly to the orientation of the principal faces of the piezoelectric plate with respect to the faces of the mother crystal from which it is cut.

An object of the invention is to produce a piezoelectric plate in which the coupling between oscillations of a desired frequency and of extraneous or undesired frequencies is eliminated.

Another object of the invention is to produce a piezoelectric plate which shall have a single, simple mode of vibration.

Another object of the invention is to produce a piezoelectric plate which will exhibit an effective reactance within a desired range of frequencies that is dependent upon a single resonance or degree of freedom and substantially independent of any other resonance.

An additional object of the invention is to produce a piezoelectric plate which shall have a small temperature coefficient.

It is well known that the electrical resonance frequency of a body of piezoelectric material corresponds substantially to the natural mechanical oscillation frequency of the body. Ordinarily, however, the body may have several possible modes of vibration which it is capable of executing simultaneously depending upon the direction and character of the applied force or forces and to some extent also upon the restraints imposed by its support or mounting. Although a theoretical analysis of the dynamic characteristics of piezoelectric plates of crystalline substances executing complex oscillations would be extremely difficult, both theory and experiment show that the behavior of an oscillating mass of crystalline substance may be predicted and, in fact, calculated from the static "constants" or characteristics of the substance. General equations representing the static characteristics of non-isotropic crystalline substances are known. These general equations present the relations between the different mechanical stresses and the resulting mechanical strains, between electric charge per unit area and strains, and between the various components of the effective electric field on the one hand and the mechanical stresses or the mechanical strains on the other.

The stresses of interest are sometimes extensional, namely, tension or compression, which tend to increase or decrease the dimension of a body in the direction of application of the stress, and sometimes shear which produce a resulting deformation that distorts the shape of an original unit cube without changing the superficial areas of the planes in which these strains occur. The application and withdrawal or reversal of such stresses would naturally be attended with a similar pulsating or oscillating condition of the resultant strain. It is accordingly necessary in the piezoelectric art to take into account both extensional and shear oscillations. Moreover, shear strains of oscillating character are generally attended with bending or flexural oscillations which, in the case of long members such as thin rods or bars may appear as sinuous motions of the bar.

The electrical resonance or reactance characteristics of piezoelectric devices make them of much importance as elements of electric wave filters. If, however, in addition to a desired electrical resonance corresponding to a particular mode of vibration, the device possesses other resonances either closely adjacent the desired resonance or corresponding to vibrations of other modes which are coupled to the vibrations of the desired mode its resultant reactance characteristic may be so complex as to render the device useless as an element of a filter. It is, therefore, of the utmost importance to be able to eliminate the effect of such extraneous oscillations or resonances by removing the coupling in the case of coupled oscillations and by increasing the separation of the resonances in the case of uncoupled oscillations.

In the case of piezoelectric plates which are excited electrically and maintained in oscillation by means of amplifying devices controlled by the oscillations themselves, it frequently transpires that along with the desired oscillations there occur undesired oscillations of some closely adjacent frequency which are effectively coupled with the desired oscillations. These undesired oscillations may be produced either directly or as harmonics of lower frequency oscillations of some other mode of vibration. Whatever their origin, they are difficult to suppress and in the usual case they deleteriously affect the desired output oscillations making their frequency unstable and giving rise to so-called "hops" in the frequency of the piezoelectric crystal plate when its temperature changes.

Since the undesired resonances or oscillations of piezoelectric devices correspond to definite strains in the substance it will be appreciated that their elimination may be effected if some expedient be adopted for eliminating the effect upon the desired oscillations of those particular strains without, however, neutralizing the stresses and strains corresponding to the desired oscillations. It is, moreover, not necessary to eliminate all stresses or strains other than the one set desired but only those strains which are coupled to the desired strains and whose oscillations therefore affect the desired oscillations. In accordance with the invention, this is accomplished by so orienting the boundary planes of the crystal plate with respect to the faces of the mother crystal that in the new set of stress strain relations which ensue either the undesired strain disappears or the coupling between the desired and the undesired strain vanishes.

It has been generally observed that although theoretically the frequency of a crystal can be computed quite readily using a particular dimension and modulus of the crystal the frequency in actual practice varies with the ratio of certain of the dimensions. This effect is occasioned by the coupling of the desired mode of vibration with other modes of vibration and makes design of the crystal to meet definite requirements much more difficult. Elimination of the coupling accordingly simplifies the crystal design enabling frequencies to be precomputed with assurance and also enabling slight adjustment of crystal frequencies to be made by grinding without encountering the troublesome phenomenon of hops.

Crystalline substances fall within certain definite classifications determined by their molecular structure, quartz and tourmaline coming within the trigonal group. Both quartz and tourmaline crystals, as is well known, have certain principal axes commonly designated as the X or electric axis, the Y or mechanical axis, and the Z or optical axis. In consequence of the pioneer work of Voigt, whose treatise entitled, Jahrbuch der Kristallphysik, was published in 1910 by B. G. Teubner, Leipzig, we are able to express the relations between static stresses and strains in quartz and in tourmaline in terms of the following equations in which small letters represent deformations or strains and capital letters represent forces or stresses. In each instance the subscript denotes the axis corresponding to the direction of the stress or strain. In the case of an extensional stress, for example, $x_x$ denotes an extensional strain along the X axis and $X_x$ an extensional stress along the X axis. In the case of shear forces and deformations both letters must be taken into account to determine the plane, $X_y$ representing a shear stress in the XY plane and $y_z$ a shear strain in the YZ plane.

(1)
$$-x_x = s_{11}X_x + s_{12}Y_y + s_{13}Z_z + s_{14}Y_z + 0 + 0$$
$$-y_y = s_{12}X_x + s_{11}Y_y + s_{13}Z_z - s_{14}Y_z + 0 + 0$$
$$\quad (s_{21}) \quad (s_{22}) \quad (s_{23}) \quad (s_{24})$$
$$-z_z = s_{13}X_x + s_{13}Y_y + s_{33}Z_z + 0 + 0 + 0$$
$$\quad (s_{31}) \quad (s_{32})$$
$$-y_z = s_{14}X_x - s_{14}Y_y + 0 + s_{44}Y_z + 0 + 0$$
$$\quad (s_{41}) \quad (s_{42})$$
$$-z_x = 0 + 0 + 0 + 0 + s_{44}Z_x + 2s_{14}X_y$$
$$\quad\quad\quad\quad\quad\quad (s_{55}) \quad (s_{56})$$
$$-x_y = 0 + 0 + 0 + 0 + 2s_{14}Z_x + s_{66}X_y$$
$$\quad\quad\quad\quad\quad\quad\quad\quad (s_{65})$$

In order to simplify the equations the equivalent $s$ coefficients have been used wherever possible in lieu of the positional coefficients shown in parenthesis immediately beneath.

In the Equations 1 $X_x$, $Y_y$, and $Z_z$ are extensional stresses along the X, Y, and Z axes and $x_x$, $y_y$, and $z_z$ are the concomitant extensional strains. $Y_z$, $Z_x$, and $X_y$ are shearing stresses in the YZ, ZX, and XY planes respectively, and $y_z$, $z_x$, and $x_y$, are the corresponding shearing strains. The moduli for elongation or compression along the three crystallographic axes X, Y, and Z are respectively, $$\frac{1}{s_{11}}, \frac{1}{s_{22}}, \text{ and } \frac{1}{s_{33}}$$

The rigidity or shear moduli for the YZ, ZX, and XY planes are respectively, $$\frac{1}{s_{44}}, \frac{1}{s_{55}}, \text{ and } \frac{1}{s_{66}}$$

Assume, for instance, that a hypothetical cube of quartz, the faces of which lie in the XY, YZ, and ZX planes, respectively, is squeezed or compressed in the Y direction so that the only applied stress is $Y_y$ and $X_x$, $Z_z$, $Y_z$, $Z_x$ and $X_y$ are zero.

Under these circumstances Equation 1 will reduce to:

(2)
$$\begin{cases} -x_x = s_{12}Y_y = -17 \times 10^{-14} Y_y \frac{cm^2}{dyne} \\ -y_y = s_{11}Y_y = 130 \times 10^{-14} Y_y \frac{cm^2}{dyne} \\ -z_z = s_{13}Y_y = -15 \times 10^{-14} Y_y \frac{cm^2}{dyne} \\ -y_z = s_{14}Y_y = 43 \times 10^{-14} Y_y \frac{cm^2}{dyne} \\ -z_x = 0 \\ -x_y = 0 \end{cases}$$

The magnitudes of $s_{11}$, $s_{12}$, $s_{13}$, and $s_{14}$ which are definite "constants" of quartz were determined by Voigt.

Equation 2 shows that on application of a $Y_y$ compressional stress with an ensuing contractional strain of 130 units along the direction of the compressing force (Y axis) there is also an expansion of 17 units along the X axis and 15 units along the Z axis. There is also a $y_z$ shear strain of 43 units.

If a stress of a simple type as, for example, an extensional stress along the X axis ($X_x$) be applied it may produce in addition to the naturally expectable extensional strain along the X axis, extensional strains in the directions of the Y and Z axes and a shear strain in the YZ plane. This is, of course, what is apparent from Equation 1 when all stresses except $X_x$ become zero. The three strains which are not in the direction of the applied stress but are at right angles thereto are accordingly termed herein cross strains.

It is apparent from Equations 1 and 2 and the equations similar to (2) that are obtained when $X_x$, $Y_y$, or $Z_z$ is the only applied stress that for a cubical element whose edges are parallel to the crystallographic axes X, Y, and Z every one of the stresses $X_x$, $Y_y$ and $Z_z$ will produce some strain not corresponding in its direction with the stress itself. Equation 2 shows specifically that for a $Y_y$ stress there are in addition to the $y_y$ strain, concomitant strains $x_x$ and $z_z$ of the extensional type as well as $y_z$ of the shear type.

Since the elastic moduli in quartz are not the same in different directions and the fundamental period of vibration in a given direction in a particular mode of vibration is dependent upon both the corresponding modulus and the dimension in that direction, it is to be expected that one of the oscillations set up through the cross strains (either extensional, shear or flexural) or one of its harmonics may, with certain relations between the dimensions of the edges of the crystal plate, closely approximate in frequency the fundamental extensional oscillations. The coupling between the two modes of vibration when this is the case is in general sufficient to make it practically impossible to secure the effect of one resonance free from that of the other. If, however, it be possible to establish a different oscillating system in the crystal plate so that the desired oscillations are not attended with undesired cross strains which are coupled therewith, the undesired resonances may be made to disappear. The new system of oscillations may contain oscillations of other modes but this will not vitiate the desired result if those additional oscillations are either not coupled with those desired or if their fundamental frequencies or the frequencies of their harmonics are sufficiently removed from the desired frequency so as not to materially influence or affect it. To accomplish this effect resort is had to the expedient of cutting the crystal plate at an angle to one or more of the original orthogonal axes of the mother crystal. The stresses which are applied to the plane faces of the resulting plate are accordingly applied in a changed direction with respect to the interior elementary volumes of the crystal structure and the particular extensional and shear moduli which are brought into play are of different magnitudes than those of the conventional XYZ axis orientation. Hereinafter, a piezoelectric unit or plate having its three orthogonal planes or external faces so oriented as to have each parallel respectively to two of the crystallographic axes will be referred to as of "normal" orientation.

The foregoing discussion with respect to elimination of a cross strain is based on applications of mechanical forces to a quartz structure the elastic constants of which and the stress strain characteristics of which are known. In applications to electric circuits of piezoelectric plates designed according to these principles, the situation is still more complex for the reason that instead of applying a simple, mechanical force, it is customary to apply an electric stress. An applied electric stress may give rise to more than one mechanical stress as may be seen from the following equations which express the relationship between the components of an applied electric field and the corresponding mechanical stresses induced and the resulting strains for quartz.

(3)
$$-X_x = e_{11}E_x + OE_y + OE_z$$
$$-Y_y = -e_{11}E_x + OE_y + OE_z$$
$$-Z_z = OE_x + OE_y + OE_z$$
$$-Y_z = e_{14}E_x + OE_y + OE_z$$
$$-Z_x = OE_x - e_{14}E_y + OE_z$$
$$-X_y = OE_x - e_{11}E_y + OE_z$$

(4)
$$x_x = d_{11}E_x + OE_y + OE_z = -6.4 \times 10^{-8} E_x \frac{\text{e. s. u.}}{\text{dynes}}$$
$$y_y = -d_{11}E_x + OE_y + OE_z = 6.4 \times 10^{-8} E_x \frac{\text{e. s. u.}}{\text{dynes}}$$
$$z_z = OE_x + OE_y + OE_z = 0$$
$$y_z = d_{14}E_x + OE_y + OE_z = 1.7 \times 10^{-8} E_x \frac{\text{e. s. u.}}{\text{dynes}}$$
$$z_x = OE_x - d_{14}E_y + OE_z = -1.7 \times 10^{-8} E_y \frac{\text{e. s. u.}}{\text{dynes}}$$
$$x_y = OE_x - 2d_{11}E_y + OE_z = 12.8 \times 10^{-8} E_y \frac{\text{e. s. u.}}{\text{dynes}}$$

Where each of the quantities is expressed in terms of electrostatic units of charge per dyne and $E_x$, $E_y$, and $E_z$ are the components of the electric field parallel respectively to the X, Y, and Z axes. The piezoelectric coefficients $e_{11}$, $e_{14}$, $d_{11}$ and $d_{14}$ are coefficients of proportionality between the stresses $X_x$, etc., of Equation 3 and strains $x_x$, etc., of Equation 4 and the applied voltage gradients $E_x$, $E_y$ and $E_z$. Equations 3 and 4 are taken from Voigt hereinbefore mentioned.

The foregoing Equations 3 and 4 and the subsequent equations dependent thereon which involve the piezoelectric relations of quartz are not applicable to tourmaline which has a different system of piezoelectric relationships. An entirely similar method, however, may be used in design of tourmaline plates by employing in lieu of Equations 3 and 4 the piezoelectric equations for tourmaline. See, for example, page 79 of the article by Koga, vol. 3, Physics, August, 1932.

Equations 3 and 4 are very useful in enabling one to readily ascertain what mechanical stresses and what strains may be directly induced by an electric field component parallel to a particular axis and what set of stresses occur together as a consequence of applying an electric field parallel to a particular axis. For example, Equation 3 shows that the $Z_z$ stresses due to each of the three possible components of electric field are zero, in other words, that it is not possible to stimulate extensional stresses of piezoelectric character along the optical axis of quartz regardless of the direction of the applied field. Equation 4 gives consistent information by showing that the sum of the $z_z$ extensional strains induced in quartz by each and all of the possible electric field components is zero. Moreover, it is possible to determine directly from Equation 4 the relative magnitudes of these strains. In the case of extensional strains the negative algebraic sign indicates compression and the positive sign indicates an elongation.

In the drawings Fig. 1 illustrates a conventional perpendicular face cut or X cut quartz crystal;

Figure 1:
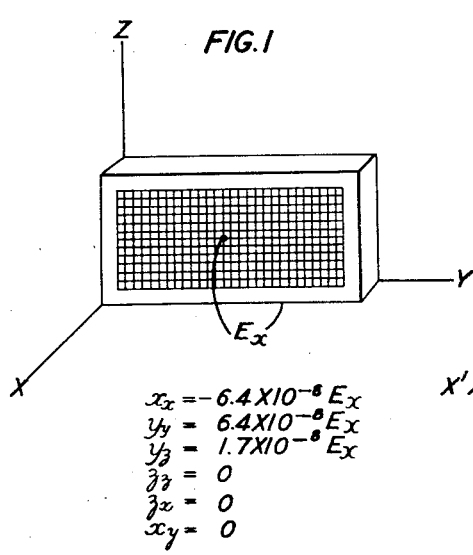

Fig. 1 of the drawings illustrate a so-called perpendicular face cut or X cut quartz plate with electrodes adjacent to its principal faces to permit the application of an $E_x$ electric field. For convenience the mechanical stresses directly induced by the $E_x$ electric field are shown beneath the figure. These are obtained from Equation 4 by making $E_y$ and $E_z$ equal to zero to comply with the condition of the system illustrated in the figure. From the static stresses it may be inferred that extensional oscillations corresponding to the $x_x$ and $y_y$ extensional strains and shear oscillations corresponding to the $y_z$ shear strain would be stimulated piezo-electrically by an oscillating $E_x$ field of the proper frequency. Experimentally, oscillations of each of these modes and their harmonics are found. Flexure oscillations not directly indicated by the foregoing equations but associated with the shear oscillations are also found. This means that as the frequency of the applied electric field is gradually increased it will successively be in accord with each of these four natural frequencies or resonances of the crystal and the crystal will at each of these frequencies exhibit the remarkable reactance characteristics which accompany its vigorous oscillations that also occur at those points. If any two occur close together the reactance behavior of the crystal at either frequency will be complex as in the case of two electrically tuned circuits of closely adjacent frequencies. It may be feasible to give the crystal plate such dimensions that the desired mode of oscillation occurs at a frequency which is remote from each of the others but there are other factors entering into the operation of piezoelectric plates which makes this difficult.

It has been pointed out that an $E_x$ field does not induce a corresponding piezoelectric response along the optical axis. This fact is also presented by the inverse piezoelectric Equations 4. However, it will be observed that the second of the Equations 3 indicates that an applied $E_x$ field stimulates a mechanical $Y_y$ stress. From the third Equation 1 it is evident that a $Y_y$ mechanical stress gives rise to a $z_z$ strain. The physical significance of these facts is this: Application of an oscillating $E_x$ field of a frequency corresponding to the natural frequency of the crystal in extensional manner along the optical axis will not excite such extensional oscillations since there is no piezoelectric coupling. However, when the applied electric field is of such frequency as to agree with the natural frequency of the $Y_y$ mode thus inducing a vigorous mechanical extensional stress in the direction of the Y axis there will also be a response of extensional optical axis oscillations by virtue of the mechanical coupling which has been described. This makes a fifth possible frequency to be taken into account.

On account of the thinness of the plate the $x_x$ extensional vibrations are of too high frequency to interfere with the resonance characteristics at the desired frequency or to seriously affect that frequency. Harmonics of the $x_x$ vibrations are, of course, still more remote in frequency. It is, however, often necessary to get rid of coupling to the $y_z$ shear oscillations and also of coupling to the still more troublesome $y_z$ flexural oscillations. This may be accomplished by rotating the cut of the crystal plate of Fig. 1 about its X axis by an angle $\theta$ so that instead of the normal orientation of Fig. 1 it will have the orientation illustrated in Fig. 2.

It will be recalled that quartz and tourmaline occur in two forms, namely, right hand and left hand. The crystal is designated as right hand if it rotates the plane of polarization of plane polarized light traveling along the optic or Z axis in a right hand direction and is designated as left hand if it rotates the plane of polarization to the left. If a compression stress be applied to the ends of the electric axis and not removed a charge will be developed which is positive at the positive end of the electric axis and negative at the negative end of the axis. The amplitude and sign of the charge may be measured with a vacuum tube electrometer. In specifying the orientation of a right hand crystal the angle $\theta$ which the new axis Z' makes with the axis Z as the crystal plate is rotated about the X axis is deemed positive when with the positive end of the X axis pointed toward the observer the rotation is in a clockwise direction. A counterclockwise rotation of such a crystal gives rise to a negative orientation angle. Conversely the orientation angle of a left hand crystal is positive when with the positive end of the electric axis pointed toward the observer the rotation is counterclockwise and is negative when the rotation is clockwise. Orientations about the Y and Z axes require only that the magnitude of the angle be given for the characteristics have the same magnitude and differ only in sign for both positive and negative angles. It is not necessary to distinguish between right hand and left hand quartz and between positive and negative X axis in orientations about the Y and Z axes.

Figure 2:
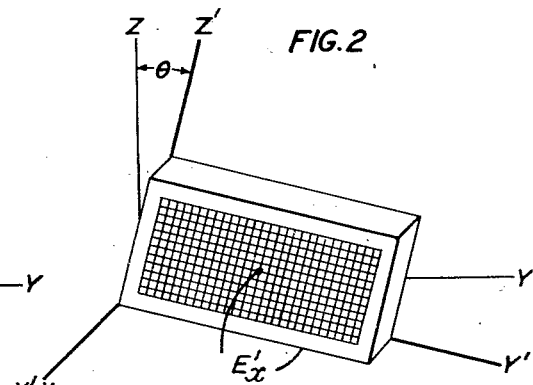
Fig. 2 shows an X cut crystal having an orientation produced by a rotation about the X or electric axis.

Fig. 2 shows a perpendicular face cut crystal the orthogonal edges of which are parallel to a system of axes X', Y', and Z'. There is applied to its principal faces by suitable electrodes an electric field $E'_x$. All quantities and directions in the normal system of Fig. 1 are designated by unprimed symbols and the analogous elements of the off-normal or reoriented system are designated by similar symbols primed. It is, of course, understood that in the case of Fig. 2 the X' axis coincides with the normal X axis. The angle $\theta$ indicates the deviation from the normal orientation of the Z' and Y' axes. In order to determine what the magnitude of this angle should be we may begin with the requirement that in the system of Fig. 2 extensional $Y'_y$ oscillations are to be produced free from any coupled shear oscillations of the $Y'_z$ mode. From another viewpoint it is the problem of reducing the cross coupling existing between the $Y_y$ stress of the Fig. 1 system and the $y_z$ strain. That cross coupling, as may be seen from the second term of the right hand member of the fourth Equation 1, is $s_{14}$. In the most general forms of the stress strain equations to be found in treatises on elasticity that constant is usually written $s_{24}$ but in the normal quartz system $s_{24}=s_{14}$ and the latter is used to simplify the expressions. Bearing in mind that $s_{24}$ represents the magnitude of the undesired cross coupling our next consideration is to transform the various equations with which we have to deal to the system of primed axes and to follow the gamut of magnitudes which the cross coupling constant $s'_{24}$ assumes as the angle $\theta$ varies.

The cosines of the direction angles between the primed and the unprimed axes may be designated according to the notation:

|    | X     | Y     | Z     |
|----|-------|-------|-------|
| X' | $l_1$ | $m_1$ | $n_1$ |
| Y' | $l_2$ | $m_2$ | $n_2$ |
| Z' | $l_3$ | $m_3$ | $n_3$ |

In other words the cosine of the angle measured from X' to X is $l_1$, that of the angle from Z' to Y is $m_3$.

In the case of a system which differs from the normal orientation only by orientation about the X axis as in the case of Fig. 2 the angle between X' and X is zero, the angles between X' and Y, X' and Z, Y' and X, Z' and X, are each 90°, those between Z' and Z, and Y' and Y are $\theta$, that between Y' and Z is $90°+\theta$, and that between Z' and Y is $90°-\theta$. The cosine diagram accordingly reduces to

|    | X       | Y              | Z               |
|----|---------|----------------|-----------------|
| X' | $l_1=1$ | $m_1=0$        | $n_1=0$         |
| Y' | $l_2=0$ | $m_2=\cos\theta$ | $n_2=-\sin\theta$ |
| Z' | $l_3=0$ | $m_3=\sin\theta$ | $n_3=\cos\theta$  |

The electric fields of the primed or off-normal system may be expressed in terms of the normal electric fields by (5)
$$E'_x = l_1 E_x + m_1 E_y + n_1 E_z$$
$$E'_y = l_2 E_x + m_2 E_y + n_2 E_z$$
$$E'_z = l_3 E_x + m_3 E_y + n_3 E_z$$

Simplifying Equation 5 by introducing the magnitudes of $l_1 \ldots n_3$ for the case of rotation by an angle $\theta$ about the X axis, (6)
$$E'_x = E_x + 0 + 0$$
$$E'_y = 0 + \cos \theta E_y - \sin \theta E_z$$
$$E'_z = 0 + \sin \theta E_y + \cos \theta E_z$$

These equations express the ordinary vector resolution of an obliquely directed electrical force into orthogonal components parallel to the set of primed axes.

Transformation of mechanical stresses or strains can not be accomplished by a simple geometrical process, which is necessarily based on isotropic conditions, for the reason that the stresses and strains which are set up in an aelotropic system by application of a definite mechanical force or system of forces are functions not only of the impressed forces but also of the elastic moduli or constants of the substance and these moduli vary in magnitude according to their orientation with respect to the normal axes. The mechanical stress transformation equations which are based upon the stress quadric are as follows:

(7)
$$X_x = l_1^2 X'_x + l_2^2 Y'_y + l_3^2 Z'_z + 2l_2 l_3 Y'_z + 2l_3 l_1 Z'_x + 2l_1 l_2 X'_y$$
$$Y_y = m_1^2 X'_x + m_2^2 Y'_y + m_3^2 Z'_z + 2m_2 m_3 Y'_z + 2m_3 m_1 Z'_x + 2m_1 m_2 X'_y$$
$$Z_z = n_1^2 X'_x + n_2^2 Y'_y + n_3^2 Z'_z + 2n_2 n_3 Y'_z + 2n_3 n_1 Z'_x + 2n_1 n_2 X'_y$$
$$Y_z = m_1 n_1 X'_x + m_2 n_2 Y'_y + m_3 n_3 Z'_z + (m_2 n_3 + m_3 n_2) Y'_z + (m_3 n_1 + m_1 n_3) Z'_x + (m_1 n_2 + m_2 n_1) X'_y$$
$$Z_x = n_1 l_1 X'_x + n_2 l_2 Y'_y + n_3 l_3 Z'_z + (n_2 l_3 + n_3 l_2) Y'_z + (n_3 l_1 + n_1 l_3) Z'_x + (n_1 l_2 + n_2 l_1) X'_y$$
$$X_y = l_1 m_1 X'_x + l_2 m_2 Y'_y + l_3 m_3 Z'_z + (l_2 m_3 + l_3 m_2) Y'_z + (l_3 m_1 + l_1 m_3) Z'_x + (l_1 m_2 + l_2 m_1) X'_y$$

See pages 80 and 81, Mathematical Theory of Elasticity by A. E. H. Love, 4th edition published 1927 by Cambridge University Press.

Upon substituting the values of $l_1 \ldots n_3$ for the special case of Fig. 2 Equations 7 reduce to:

(8)
$$X_x = X'_x + 0Y'_y + 0Z'_z + 0Y'_z + 0Z'_x + 0X'_y$$
$$Y_y = 0 + \cos^2 \theta Y'_y + \sin^2 \theta Z'_z + 2 \sin \theta \cos \theta Y'_z + 0 + 0$$
$$Z_z = 0 + \sin^2 \theta Y'_y + \cos^2 \theta Z'_z - 2 \sin \theta \cos \theta Y'_z + 0 + 0$$
$$Y_z = 0 - \sin \theta \cos \theta Y'_y + \sin \theta \cos \theta Z'_z + (\cos^2 \theta - \sin^2 \theta) Y'_z + 0 + 0$$
$$Z_x = 0 + 0 + 0 + 0 + \cos \theta Z'_x - \sin \theta X'_y$$
$$X_y = 0 + 0 + 0 + 0 + \sin \theta Z'_x + \cos \theta X'_y$$

The corresponding general transformation equations for strain are:

(9)
$$x'_x = l_1^2 x_x + m_1^2 y_y + n_1^2 z_z + m_1 n_1 y_z + n_1 l_1 z_x + l_1 m_1 x_y$$
$$y'_y = l_2^2 x_x + m_2^2 y_y + n_2^2 z_z + m_2 n_2 y_z + n_2 l_2 z_x + l_2 m_2 x_y$$
$$z'_z = l_3^2 x_x + m_3^2 y_y + n_3^2 z_z + m_3 n_3 y_z + n_3 l_3 z_x + l_3 m_3 x_y$$
$$y'_z = 2l_2 l_3 x_x + 2m_2 m_3 y_y + 2n_2 n_3 z_z + (m_2 n_3 + m_3 n_2) y_z + (n_2 l_3 + n_3 l_2) z_x + (l_2 m_3 + l_3 m_2) x_y$$
$$z'_x = 2l_3 l_1 x_x + 2m_3 m_1 y_y + 2n_3 n_1 z_z + (m_3 n_1 + m_1 n_3) y_z + (n_3 l_1 + n_1 l_3) z_x + (l_3 m_1 + l_1 m_3) x_y$$
$$x'_y = 2l_1 l_2 x_x + 2m_1 m_2 y_y + 2n_1 n_2 z_z + (m_1 n_2 + m_2 n_1) y_z + (n_1 l_2 + n_2 l_1) z_x + (l_1 m_2 + l_2 m_1) x_y$$

which for the orientation of Fig. 2 reduce to:

(10)
$$x'_x = x_x + 0y_y + 0z_z + 0y_z + 0z_x + 0x_y$$
$$y'_y = 0 + \cos^2 \theta y_y + \sin^2 \theta z_z + \sin \theta \cos \theta y_z + 0 + 0$$
$$z'_z = 0 + \sin^2 \theta y_y + \cos^2 \theta z_z + \sin \theta \cos \theta y_z + 0 + 0$$
$$y'_z = 0 + 2 \sin \theta \cos \theta y_y - 2 \sin \theta \cos \theta z_z + (\sin^2 \theta - \cos^2 \theta) y_z + 0 + 0$$
$$z'_x = 0 + 0 + 0 + 0 + \cos \theta z_x + \sin \theta x_y$$
$$x'_y = 0 + 0 + 0 + 0 - \sin \theta z_x + \cos \theta x_y$$

See Love's Mathematical Theory of Elasticity, supra, pages 41 and 42.

Substituting for the mechanical stresses $X_x$, $Y_y$, $Z_z$, $Y_z$, $Z_x$, and $X_y$, in Equation 1 their magnitudes as given in Equation 8 a new set of equations will be obtained expressing the magnitudes of the unprimed mechanical strains $x_x$, $y_y$, $z_z$, $y_z$, $z_x$, and $x_y$ in terms of $\sin \theta$, $\cos \theta$, $X'_x$, $Y'_y$, etc. Substituting these values thus obtained for $x_x$, $y_y$, $z_z$, $y_z$, etc., in Equation 9 we arrive at the expressions for the primed strains $x'_x$, $y'_y$, $z'_z$, $y'_z$, $z'_x$, and $x'_y$ in terms of $\cos \theta$, $\sin \theta$, and the primed stresses $X'_x$, $Y'_y$, etc.

It will be recalled that it was desired to find that orientation at which the modulus or constant $s'_{24}$ becomes zero. Now $s'_{24}$ is the coefficient of the $Y'_z$ term in the final equation for the strain $y'_y$. Putting that coefficient equal to zero, $$s'_{24} = s_{11}(4 \sin^2 \theta - 1) \cos^2 \theta + [2(s_{11} \cos^2 \theta - s_{33} \sin^2 \theta) - s_{44} + s^2_{13}](\cos^2 \theta - \sin^2 \theta)] \sin \theta \cos \theta = 0$$

The solution of the equation indicates that there are several possible orientations or magnitudes of the angle $\theta$ at which $s'_{24}$ becomes zero and at which the troublesome $y'_z$ cross-coupling existing when an $E'_x$ field is applied disappears. The particular one of these orientations which it is preferable to use depends on a number of factors including the frequency desired, the degree of activity in the selected mode of vibration, the relative effect upon the other characteristics of slight deviations from the theoretically correct orientation, and the temperature coefficient of frequency. In fact, it is sometimes found that an orientation which may not entirely eliminate an undesired cross coupling may, however, reduce it to a comparatively harmless magnitude and may at the same time possess a set of other characteristics which are most desirable for certain uses.

Figure 3:
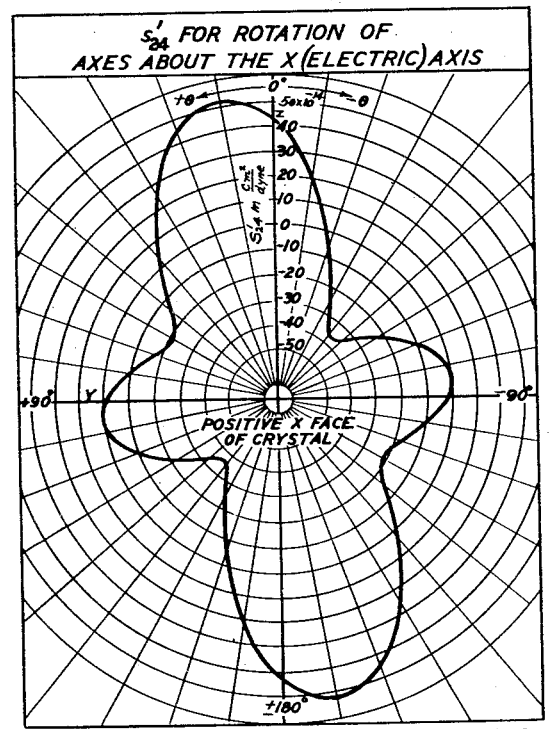
Fig. 3 is a graph showing the magnitudes of one of the elastic constants for orientations about the electric axis.
Figure 4:
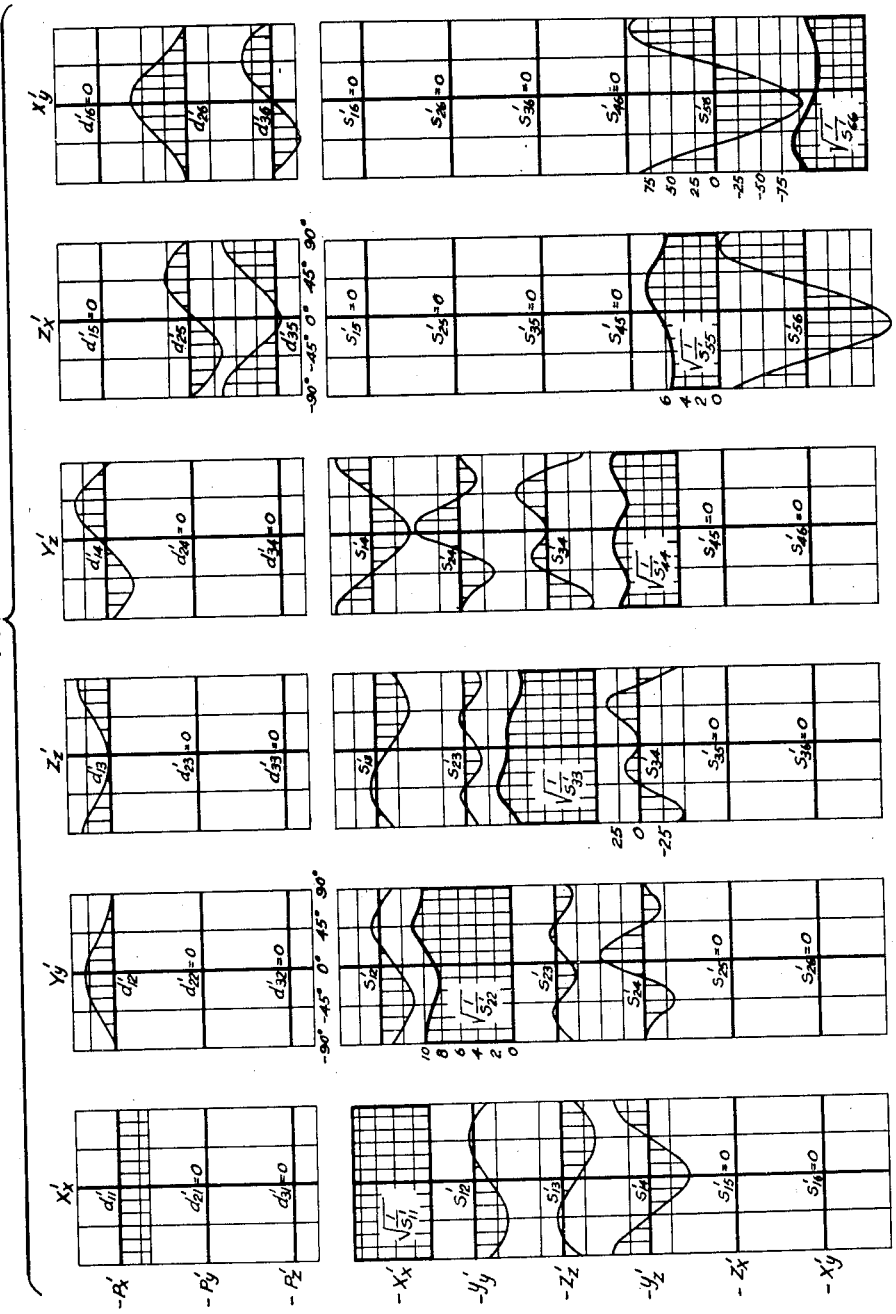
Figs. 4, 5 and 6 are charts of correlated elastic constants and electric and mechanical strains.
Figure 5:
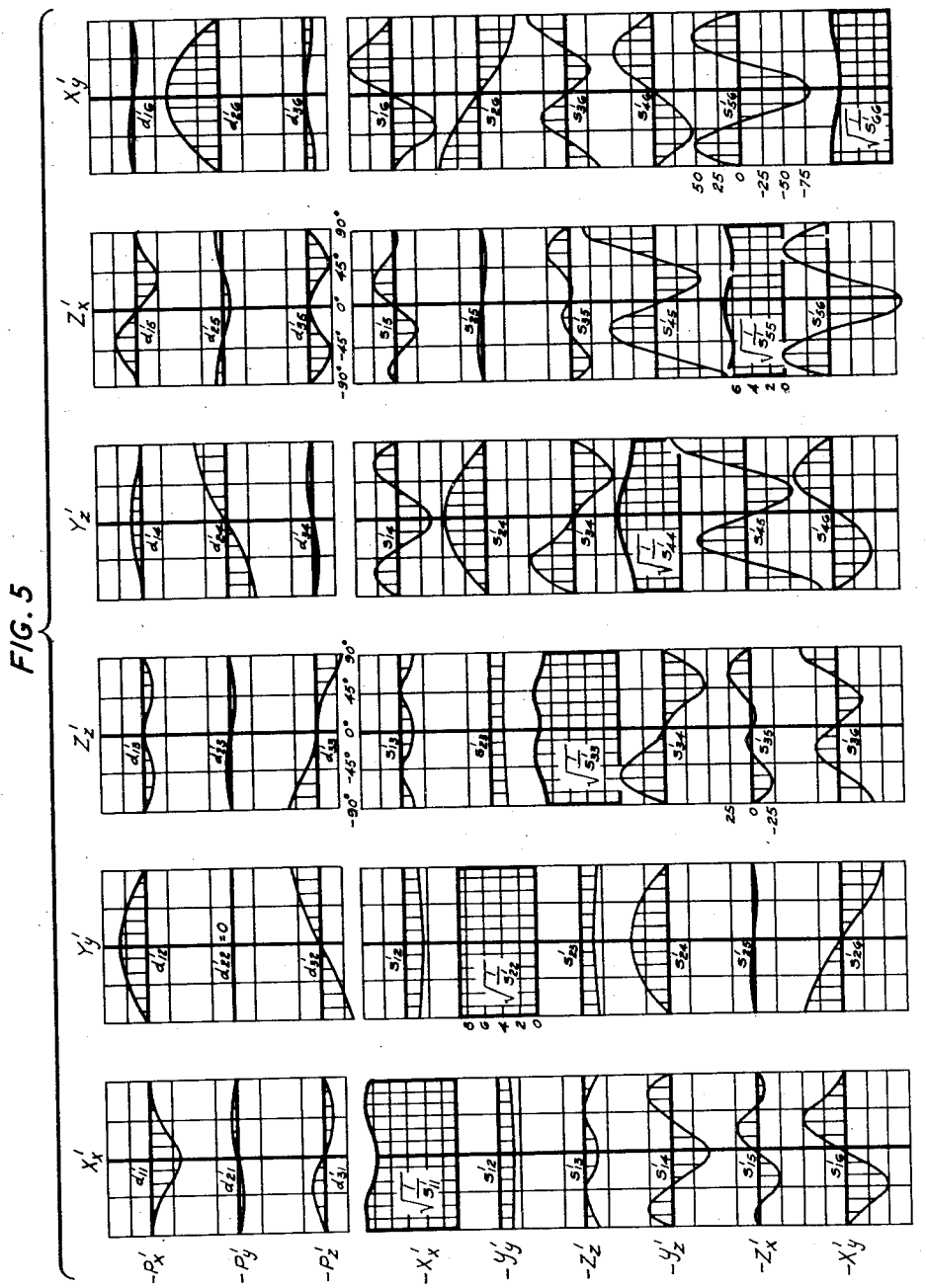
Figure 6:
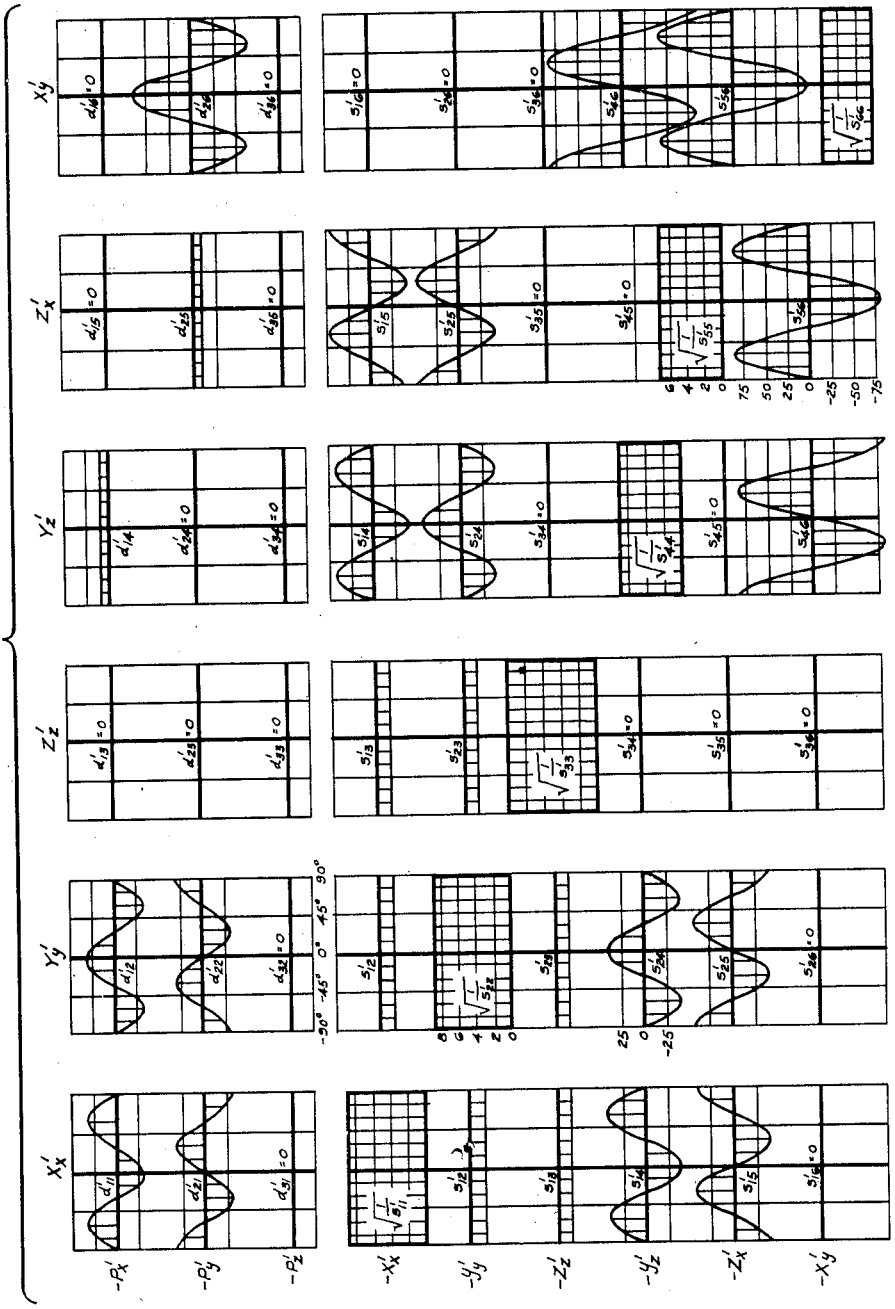

The various constants or coefficients of the transformation equations may be investigated by computing the value of each for a series of closely adjacent orientations in similar manner to determine the orientations at which the couplings to which they relate disappear or become very small. The most convenient way to make this investigation is by means of a graph or curve which portrays the variations which the modulus undergoes throughout its entire cycle of orientation. Such a graph is shown in Fig. 3. Fig. 3 enables one to immediately pick out the four orientations about the X axis at which the cross coupling coefficient $s'_{24}$ is zero. For purposes of comparison with the other characteristics it is in general more convenient to portray the various coefficients by means of arrays of graphs. Figs. 4, 5 and 6 show graphs of each of the coefficients for orientations about the X axis, Y axis and Z axis, respectively.

Referring to Fig. 4 it will be noted that each of the six columns represents the moduli and coupling coefficients which are related to the stresses and strains associated with a particular applied mechanical stress indicated at the top of the column. The three symbols associated with the first three rows at the left of the chart, viz., $P'_x$, $P'_y$ and $P'_z$, represent the piezoelectric polarization components measured in electrostatic units of charge per unit area. Using the same symbols as for the foregoing equations:

$$-P'_x = d'_{11}X'_x + d'_{12}Y'_y + d'_{13}Z'_z - d'_{14}Y'_z + 0Z'_x + 0X'_y$$

$$-P'_y = 0 + 0 + 0 + 0 - d'_{25}Z'_x + d'_{26}X'_y$$

$$-P'_z = 0 + 0 + 0 + 0 + d'_{35}Z'_x + d'_{36}X'_y$$

The lower six rows display the variations in magnitude of the six mechanical strains which correspond to the posible modes of oscillation.

In the graphs of Fig. 4 instead of the moduli $S_{11}$, $S_{22}$, $S_{33}$, $S_{44}$, $S_{55}$, $S_{66}$ which relate applied stresses directly to the corresponding strains, the square roots of these moduli are shown since they are proportional to the frequencies of the oscillations of their respective modes of vibration.

The use of the information given in Fig. 4 in designing crystal plates may be illustrated by examples. Suppose that a crystal is cut so that its $y'$ dimension is small compared to the other dimensions and that an $E'_y$ electric field is applied. By referring to the $P'_y$ row it will be seen that the only mechanical stresses which are induced are those in the last two columns. If it is desired to produce high frequency oscillations the $X'_y$ shear stress of the last column may be selected since because of the smallness of the $Y'$ dimension this may produce vibrations of high frequency. Confining attention to the last or $X'_y$ shear column it will be observed that the coefficients of the first five stresses are each zero except for $s'_{56}$ which becomes zero at orientations of $+31°$ and $-59°$. At the $+31°$ orientation which is illustrated in Fig. 7, the modulus $d'_{26}$ is large $$\left(10.1 \times 10^{-8} \frac{\text{e.s. u. units of charge}}{\text{dyne}}\right)$$

indicating relatively great activity. There is no static coupling to any other mode of vibration. $s'_{66}$ is at its maximum value and remains essentially constant for small changes in orientation. Accordingly, such an orientation permits greater tolerance in manufacture of the crystal but any considerable deviation should be avoided as it will be accompanied with appreciable magnitudes of $Z'_x$ shear.

Figure 7:
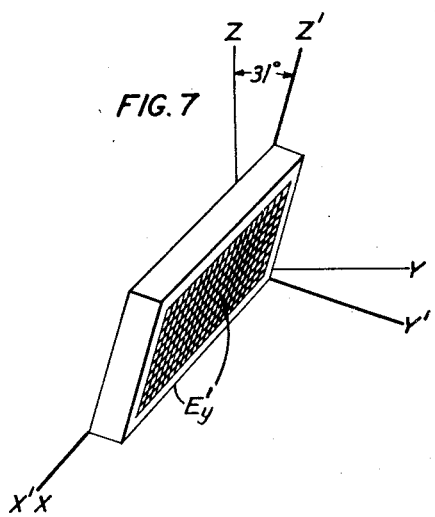
Fig. 7 illustrates a special orientation of a piezo electric plate parallel to the electric axis.

The crystal illustrated in Fig. 7 possesses a temperature coefficient of approximately $+20$ cycles in a million per C.°. The conventional Y cut quartz crystal having its principal faces parallel to the electric and optical axes has a temperature coefficient which ranges from $+80$ to $+90$ cycles per million per C.°. Accordingly, the orientation of Fig. 7 adds to the advantages which have previously been recited, that of greater constancy of frequency with changes in temperature.

The foregoing discussion of crystals of particular orientations illustrates specific cases of design. In general, two requirements may be stated as follows:

*Rule I*

In order that a particular mode of vibration may be excited electrically it must be possible to produce electrically the static mechanical stress corresponding to the strain present in the dynamical case of that particular mode of vibration. This possibility is discoverable from the piezoelectric Equations 11.

*Rule II*

In order to reduce an extraneous coupled mode of vibration to zero the coupling constant determining the static cross coupling between the extraneous strain and the desired strain must be reduced to zero.

The magnitude of the coupling constant at any particular orientation of the crystal may be calculated or may be more readily determined from graphs such as those of Figs. 4, 5 and 6.

If it had been desired to produce low frequency oscillations with the same general orientation and direction of applied electric field the $Z'_x$ mode of oscillation could have been selected since the graph in the fifth column, second row, corresponding to $P'_y$ indicates that such oscillations may be stimulated. It transpires, moreover, that the zero magnitude of the undesired coupling coefficient $s'_{56}$ occurs at the same orientation as in the case which has just been considered so that the identical crystal plate may be made to oscillate as a single frequency resonance element at either of two different frequencies, the vibrations, however, occurring with different modes in the two cases.

Another orientation which may be used involves application of an $E'_z$ electric field to a crystal plate having a small $z'$ dimension. This may be used for either $Z'_x$ or $X'_y$ shear vibrations the former of high, the latter of low frequency vibrations. In each of these two cases there is no coupling to any other mode of vibration at an orientation of 31°.

With a small $X'$ dimension and an applied $E'_x$ field freedom from coupling to any shear vibrations is found at an orientation about the X axis of $+46°$. High frequency $X'_x$ vibrations may be produced with very slight coupling to low frequency $y'_y$ vibration and small coupling to $Z'_z$ vibrations. By proper dimensioning of the plate the $Z'_z$ vibrations may be sufficiently removed in frequency to render their effect harmless.

A slightly different orientation, viz., $+42°$, with the $X'$ dimension small and an $E'_x$ applied field yields a low frequency $Y'_y$ vibration with freedom from coupling to any shear oscillations. The coupling to $Z'_z$ vibration is negligible and that to $X'_x$ vibrations is very small. At a slightly greater orientation the $Z'_z$ coupling is zero, the $Y'_z$ shear is negligible and the $X'_x$ longitudinal coupling is very small.

A similar application of the equations and graphs for rotation about the Y and Z axes may be used to determine the most favorable orientations of those types. However, all of them display some coupling to extraneous modes of vibration.

It is, of course, possible to select an orientation such that no face plane of the crystal plate is parallel to any of the normal orthogonal axes or alternatively that one pair of faces only is parallel to one original axis. For such plates the general Equations 7 and 9 are applicable. The computations which must be made are, of course, more complicated.

It is to be borne in mind that these graphs are useful not only in locating orientations having no cross couplings but also in determining orientations at which some particular troublesome cross coupling may be eliminated even though some other extraneous couplings may remain.

Figure 8:
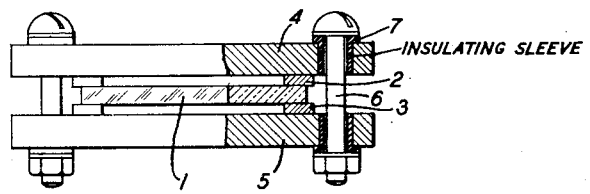
Figs. 8 and 9 are respectively an elevation and plan view of a holder for a piezoelectric element in which the element is clamped at its periphery.
Figure 9:
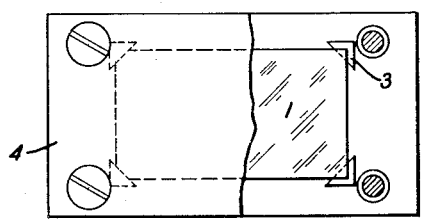

Since the 31° orientation about the X' axis with its small dimension along the Y' axis depends upon the use of shear vibrations there are present in that orientation flexural vibrations as well which are produced by the same shear strains and which can not, therefore, be eliminated by orientation. Inasmuch as the frequency of the shear vibrations increases as the plate becomes thinner and the frequency of the flexural vibrations increases as the plate is made thicker, it is possible to so proportion the thickness of the plate with respect to the other characteristics desired as to discriminate in favor of the shear frequency oscillations and against the flexural frequency oscillations. It is also possible to discriminate in favor of the shear frequency vibrations as against the flexural frequency vibrations by clamping the periphery of the plate as disclosed, for example, in Figs. 8 and 9, which show a piezoelectric plate 1 clamped in position at its periphery between salient portions 2 and 3 of upper electrode 4 and lower electrode 5 respectively. The clamping is effected by bolts 6 extending through apertures in electrodes 4 and 5 and insulated from the electrodes by surrounding insulating sleeves or bushings 7. These two expedients for discriminating in favor of the shear frequency vibrations as against the flexural frequency vibrations may be used separately or in conjunction in accordance with the requirements of the particular situation to be met.

Figure 10:
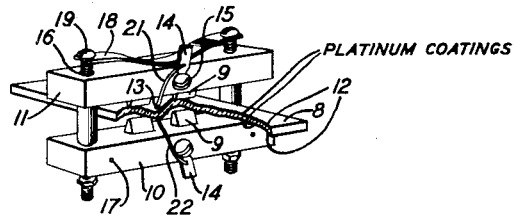
Fig. 10 illustrates a holder for a piezoelectric element in which the element is clamped at a central nodal portion.

Crystal plates having such orientation as to eliminate cross strains vibrate at modes which have nodes in general along center lines of the crystal and perpendicular to its boundary edge. This is especially true of long bars. It is accordingly generally easier to clamp bars so oriented and the clamping has a smaller effect upon the fundamental desired oscillations than in the case of the normal orientation. A mounting particularly suitable for clamping crystal plates of the long bar type is disclosed in Fig. 10 in which a piezoelectric plate 8 shown partly cut away is held between two spaced pairs of knife-edge projections 9 formed along the center line of blocks 10 and 11 consisting of insulating material of any suitable type. The major faces of the piezoelectric element 8 are coated with a conducting material, such as platinum, to form electrodes 12. Electrical connection is made to each of the electrodes by the flexible wires 21 and 22 each of which is soldered at one end to one of the crystal coatings as indicated at 13, and at the other end is soldered to the terminal 14 suitably held in place on the respectively adjacent block 10 or 11 by a screw 15. The blocks 10 and 11 are held together by sleeve bolts 16 which have a driving fit in holes drilled through the block 10 and are held in place by the pins 17. The block 11 is given a sliding fit over the bolt 16 so that the pressure of the projections 9 against the piezoelectric plate may be regulated by adjusting the compression of the spring 18 under the control of the screws 19 which thread into tapped holes in the ends of the bolts 16. The screws 19 are tightened until the piezoelectric element 8 is held firmly in place by the projections 9. The proper pressure may be determined by attempting to move the crystal with respect to its holder by hand.

Wave filters employing piezoelectric plates as elements are disclosed in W. P. Mason Patent 1,921,035, August 8, 1933. Piezoelectric plates having orientations determined in accordance with the principle of this invention and clamped either at the periphery or along the central nodal lines as disclosed in Figs. 8 to 10 to which reference has been made may advantageously be employed in such filter circuits.

The frequency of a piezoelectric plate vibrating in a particular mode is in general dependent upon several dimensions. The orientations which are made available in accordance with the present invention not only simplify the resonance characteristics of the crystal but tend to make the desired resonance frequency less subject to variations with changes in dimensions of the crystal. The invention makes it possible to largely free the resonance frequency of the crystal from the effects of change in dimensions with which the particular resonance is not directly concerned. It is therefore possible to make precision adjustments by grinding to reduce that dimension of the plate which determines the frequency of a desired mode of operation without regard to the change which this makes in ratio between the diminished dimension and the other dimensions of the crystal. Moreover since the other dimensions no longer enter into the mode of the desired oscillations they may be given much greater tolerances in the limits to which they are to conform without affecting the oscillation of the desired mode. It accordingly transpires that the precise dimensioning of the crystal is not so important as in the case of normal orientations. This gently simplifies manufacturing such crystals in quantity.

In the case of piezoelectric plates operating at so-called "harmonic frequencies" as in the case of the ordinary tuning fork producing "harmonics" it is well known that the overtones so designated are not actual multiples of the base frequency oscillations. This is for the reason that both the base frequency resonances and those of the overtones are complex and functions of two or more coupled resonances and the ratios of the other dimensions in terms of wavelengths is different for the overtones from that of the fundamental frequency. If, however, the system of resonances be so simplified as to depend on a single dimension or at least to be uncoupled to any other resonance, the vibrating member may have along with its fundamental mechanical and electrical oscillations, overtone mechanical and electrical oscillations which are true multiples or harmonics of the fundamental. It is accordingly possible and feasible to design piezoelectric plates in accordance with this invention to operate at precomputed harmonic frequencies with very great advantage over "harmonic" piezoelectric systems of the prior art in which the fundamental and overtone frequencies are not so related and in which the "harmonics" which an associated vacuum tube or other translating device may tend to produce and those which the piezoelectric plate initiates are not of the same numerical frequency.

It is often noted that piezoelectric plates subjected to high electric stress may during vibration exhibit a tendency to corona and even to arcing between points of high potential difference. This limits the load which may be safely imposed. In many cases the potential difference may rise to a high value between relatively closely adjacent points on the same surface of a piezoelectric plate because of coincidence of nodal lines at these points. Simplification of the piezoelectric plate resonances in accordance with the principles of this invention simplifies the pattern of electric potential distribution and considerably reduces the tendency to corona and arcing at the same time permitting an increase in the magnitude of the excitation to which the piezoelectric plate may be safely subjected.

The principles of piezoelectric design which have been discussed are applicable to any piezoelectric material in which it may be desired to simplify the oscillation characteristic or to eliminate some particular resonance. The equations which are applicable in any particular case correspond to those of the class having the appropriate molecular grouping. Love, supra, pages 158 to 160 indicates the various classes of substances whose properties have been studied and presents the corresponding stress strain equations.

What is claimed is:

1. A quartz crystal pieloelectric element having substantially plane boundary surfaces, the plane surface of greatest area lying substantially parallel to the electric or X axis of its native crystal and inclined at an angle of substantially $+31°$ with respect to the optical axis as measured in a plane perpendicular to said surface of greater area.

2. A piezoelectric element comprising a mass of quartz having two substantially plane boundary surfaces substantially parallel to each other, the dimension of the mass between said surfaces being relatively small with respect to any dimension of said surfaces, said surfaces lying substantially parallel to the electric axis of the material and inclined at an angle of substantially $+31°$ with respect to the optical axis as measured in a plane perpendicular to said surfaces, electrodes placed in contact with said surfaces and means for applying an electromotive force therebetween.

3. A piezoelectric element comprising a mass of quartz, the principal superficial area of which comprises two major surfaces lying substantially parallel to an electric axis of the quartz and inclined at an angle of substantially $+31°$ with respect to the optical axis measured in a plane perpendicular to said major surfaces, an electrode positioned adjacent each of said surfaces, and means for clamping the element between said electrodes.

4. A quartz crystal piezoelectric body having its major plane substantially parallel to an electric axis thereof and inclined at an angle of substantially $+31$ degrees with respect to the optic axis thereof as measured in a plane perpendicular to said major plane.

5. A piezoelectric quartz element having an electrode and major face substantially parallel to an electric axis and inclined at such an angle substantially $+31$ degrees with respect to the optic axis measured in a plane perpendicular to said face, as to produce a desired shear mode of vibration therein when subjected to an electric field in the direction of the thickness dimension perpendicular to said electrode face and vibrated in said desired shear mode of vibration at a frequency which is a function of said thickness dimension.

6. A piezoelectric quartz element having an electrode and major face substantially parallel to an electric axis and inclined at such an angle of substantially $+31$ degrees with respect to the optic axis measured in a plane perpendicular to said major face, as to produce substantially a single effective vibration frequency when subjected to an electric field in a direction perpendicular to said major electrode face and vibrated in a shear mode of vibration at a frequency which is determined by the dimensions of said major face.

7. A quartz piezoelectric crystal element adapted to vibrate in a desired mode at a frequency which is substantially a function of its thickness or smallest dimension perpendicular to its major faces, each of said major faces being of substantially rectangular shape and having one pair of opposite edges substantially parallel to an X-axis and the other pair of edges inclined substantially $+31$ degrees with respect to the Z-axis to produce low coupling with other mode vibrations.

8. A quartz piezoelectric crystal element adapted to vibrate in a desired mode at a frequency which is substantially a function of its thickness of smallest dimension perpendicular to its major faces, each of said major faces being of substantially rectangular shape and having one pair of opposite edges substantially parallel to an X-axis and the other pair of edges inclined substantially $+31$ degrees with respect to the Z-axis to produce low coupling with other mode vibrations, electrodes adjacent each of said major faces and means clamping said element between said electrodes.

9. A quartz piezoelectric crystal element adapted to vibrate in a desired mode at a frequency which is substantially a function of its thickness or smallest dimension perpendicular to its major faces, each of said major faces being of substantially rectangular shape and having one pair of opposite edges substantially parallel to an X-axis and the other pair of edges inclined substantially $+31$ degrees with respect to the Z-axis to produce low coupling with other mode vibrations, electrodes adjacent said major faces, and means adjacent the periphery only of said major faces for clamping said element therebetween.

10. A quartz piezoelectric crystal element adapted to vibrate in a desired mode at a frequency determined substantially by its thickness or smallest dimension perpendicular to its major faces, said major faces being substantially rectangular, and being disposed substantially parallel to an X-axis and inclined with respect to the Z-axis substantially +31 degrees as measured in a plane perpendicular to said major faces to produce low coupling with other mode vibrations, electrodes adjacent each of said major faces, and means clamping said element between said electrodes.

11. A quartz piezoelectric crystal cut from a crystalline body and adapted for operation in a shear mode at an odd harmonic said odd harmonic being a high or ultra high frequency, said crystal being so cut that its electrode faces are substantially parallel to an X-axis of the crystalline body and make an angle of substantially +30 degrees with the Z-axis of the crystalline body said angle being measured in a plane substantially perpendicular to said electrode faces.

12. A method of operating a crystal at an odd harmonic in a shear mode which comprises so cutting the crystal that its electrode faces are parallel to the X-axis and make an angle of substantially +30 degrees with the Z-axis and applying a field of a frequency corresponding to the desired shear mode harmonic.

13. A quartz piezoelectric crystal cut from a crystalline body adapted for operation in a shear mode at an odd harmonic said harmonic being a high or ultra high frequency, said crystal being so cut that its electrode faces are substantially parallel to an X-axis of the crystalline body and make an angle of substantially +30 degrees with the Z-axis of the crystalline body, said angle being such as will produce a low coupling coefficient in the crystal to other mode vibrations.

14. A quartz crystal piezoelectric body having its major plane substantially parallel to an electric axis thereof and inclined at an angle of substantially −59 degrees with respect to the optic axis thereof as measured in a plane perpendicular to said major plane.

15. A piezoelectric quartz element having an electrode and major face substantially parallel to an electric axis and inclined at such an angle substantially −59 degrees with respect to the optic axis measured in a plane perpendicular to said face, as to produce substantially a single effective vibration frequency when subjected to an electric field in the direction of the thickness dimension perpendicular to said electrode face and vibrated in a shear mode of motion at a frequency which is a function of said thickness dimension.

16. A piezoelectric quartz element having an electrode and major face substantially parallel to an electric axis and inclined at such an angle of substantially −59 degrees with respect to the optic axis measured in a plane perpendicular to said major face, as to produce substantially a single effective vibration frequency when subjected to an electric field in a direction perpendicular to said major electrode face and vibrated in a shear mode of vibration at a frequency which is determined by the dimensions of said major face.

17. A quartz piezoelectric crystal element adapted to vibrate in a desired mode at a frequency which is substantially a function of its thickness or smallest dimension perpendicular to its major faces, each of said major faces being of substantially rectangular shape and having one pair of opposite edges substantially parallel to an X-axis and the other pair of edges inclined substantially −59 degrees with respect to the Z-axis to produce low coupling with other mode vibrations.

18. A quartz piezoelectric crystal element adapted to vibrate in a desired mode at a frequency which is substantially a function of its thickness or smallest dimension perpendicular to its major faces, each of said major faces being of substantially rectangular shape and having one pair of opposite edges substantially parallel to an X-axis and the other pair of edges inclined substantially −59 degrees with respect to the Z-axis to produce low coupling with other mode vibrations, electrodes adjacent each of said major faces and means clamping said element between said electrodes.

19. A quartz piezoelectric crystal element adapted to vibrate in a desired mode at a frequency which is substantially a function of its thickness or smallest dimension perpendicular to its major faces, each of said major faces being of substantially rectangular shape and having one pair of opposite edges substantially parallel to an X-axis and the other pair of edges inclined substantially −59 degrees with respect to the Z-axis to produce low coupling with other mode vibrations, electrodes adjacent said major faces, and means adjacent the periphery only of said major faces for clamping said element therebetween.

20. A quartz piezoelectric crystal element adapted to vibrate in a desired mode at a frequency determined substantially by its thickness or smallest dimension perpendicular to its major faces, said major faces being substantially rectangular, and being disposed substantially parallel to an X-axis and inclined with respect to the Z-axis substantially −59 degrees as measured in a plane perpendicular to said major faces to produce low coupling with other mode vibrations, electrodes adjacent each of said major faces, and means clamping said element between said electrodes.

21. A quartz crystal piezoelectric body having its major plane substantially perpendicular to an electric axis and substantially parallel to a mechanical crystallographic or Y axis thereof and having its major axis inclined at an angle substantially −18.5 degrees with respect to said mechanical crystallographic axis thereof.

22. A quartz crystal piezoelectric body having its major plane substantially perpendicular to an electric axis and substantially parallel to a mechanical crystallographic or Y axis thereof and having a dimension in the direction of said electric axis relatively small with respect to its major axis dimension, and having its major axis inclined at such an angle substantially −18.5 degrees with respect to said mechanical crystallographic axis thereof as to produce a desired extensional mode of vibration along said major axis substantially uncoupled with any shear vibration in said major plane and any extensional vibration in the direction of said electric axis.

23. Piezoelectric apparatus comprising a piezoelectric quartz crystal plate of substantially rectangular parallelepiped shape having its major plane, its opposite major electrode faces, and its major or longest axis disposed substantially parallel to the plane of the Z axis and a Y axis, and perpendicular to an X axis, electrodes disposed adjacent said major electrode faces applying an electric field to said crystal plate in the direction of said X axis and in the direction of the thickness dimension between said major faces for producing a desired extensional mode of vibration at the fundamental frequency along said longest axis, and means for clamping said crystal plate along the central nodal lines thereof to cause it to maintain a relatively fixed normal relation with respect to said clamping means, said crystal plate having said longest axis inclined at such an acute angle of substantially −18.5 degrees with respect to said Y axis as to produce substantially zero coupling of said desired extensional mode of vibration with any shear mode of vibration in said plane of said Z and Y axes and for producing a small frequency change in said desired extensional mode of vibration for a given error in the width dimension of said crystal plate, said dimension of thickness between said major faces being sufficiently small compared to said longest axis to prevent undesired extensional vibrations in the direction of said thickness dimension from affecting said desired extensional mode of vibration in the direction of said longest axis.

24. A piezoelectric quartz crystal element having a major axis and opposite electrode faces disposed substantially parallel to the plane of a Y axis and the Z axis and perpendicular to an X axis, said major axis being inclined at an angle of substantially −18.5 degrees with respect to said Y axis to produce a desired extensional mode of vibration along said major axis substantially uncoupled with any shear mode of vibration in the plane of said Y and Z axes when an electric field is applied in the direction of said X axis by electrodes adjacent said electrode faces, said crystal having a dimension of thickness in the direction of said X axis sufficiently small compared to said major axis dimension to prevent undesired extensional vibrations along said thickness dimension from affecting said desired extensional mode of vibration along said major axis.

25. A piezoelectric quartz crystal element having a major axis and opposite electrode faces disposed substantially parallel to the plane of a Y axis and the Z axis and perpendicular to an X axis, said major axis being inclined at an angle of substantially −18.5 degrees with respect to said Y axis to produce a desired extensional mode of vibration along said major axis substantially uncoupled with any shear mode of vibration in the plane of said Y and Z axes when an electric field is applied in the direction of said X axis by electrodes adjacent said electrode faces, said crystal having a dimension of thickness in the direction of said X axis sufficiently small compared to said major axis dimension to prevent undesired extensional vibrations along said thickness dimension from affecting said desired extensional mode of vibration along said major axis, and means for clamping said crystal along the nodal lines thereof.

26. A piezoelectric quartz crystal element having a longitudinal or Y' axis and an electrode face disposed substantially parallel to the plane of a Y axis and the Z axis and perpendicular to an X axis, said longitudinal axis being inclined substantially −18.5 degrees with respect to said Y axis to produce a desired extensional mode of vibration along said longitudinal axis substantially uncoupled to any shear mode of vibration therein when an electric field is applied thereto in the direction of said X axis, the dimension of thickness in the direction of said X axis being small enough relative to said longitudinal axis to prevent thickness extensional vibrations therein from affecting said desired extensional mode of vibration.

27. A quartz crystal piezoelectric element adapted to vibrate in a longitudinal mode at a frequency which is substantially a function of its longest or Y' dimension, said element having substantially rectangular major faces disposed substantially parallel to the plane of a Y-axis and the Z-axis, said Y' dimension being inclined substantially −18.5 degrees with respect to said Y-axis to produce low coupling with other mode vibrations, electrodes formed integral with each of said major faces, and means in contact with said electrodes for clamping said element at a plurality of pairs of oppositely disposed points of relatively small area along the nodal lines thereof to hold said element against bodily movement out of a predetermined position.

28. A quartz crystal piezoelectric element adapted to vibrate in a longitudinal mode at a frequency which is substantially a function of the longest or Y' dimension, said element having substantially rectangular major faces disposed substantially parallel to the plane of a Y-axis and the Z-axis, said Y' dimension being inclined substantially +42 degrees with respect to said Y-axis to produce low coupling with other mode vibrations, electrodes formed integral with each of said major faces, and means in contact with said electrodes for clamping said element at a plurality of pairs of oppositely disposed points of relatively small area along the nodal lines thereof to hold said element against bodily movement out of a predetermined position.

29. A quartz crystal piezoelectric body having its major plane substantially perpendicular to an electric axis and substantially parallel to a mechanical crystallographic or Y axis thereof and having a dimension in the direction of said electric axis relatively small with respect to its major axis dimension, and having its major axis inclined at such an angle substantially +42 degrees with respect to said mechanical crystallographic axis thereof as to produce a desired extensional mode of vibration along said major axis substantially uncoupled with any shear vibration in said major plane and any extensional vibration in the direction of said electric axis.

30. A quartz crystal piezoelectric body having its major plane and opposite electrode faces substantially perpendicular to an electric axis and substantially parallel to a mechanical or Y axis thereof and having an axis of said major plane inclined at an angle substantially 46 degrees with respect to said mechanical crystallographic axis thereof to produce freedom from coupling with shear vibrations when subjected to an electric field in the direction of said electric axis and vibrated in an extensional mode of motion at a frequency which is a function of said electric axis or thickness dimension.

WARREN P. MASON.
ROGER A. SYKES.